(12) United States Patent
Bey, Jr. et al.

(10) Patent No.: US 7,832,269 B2
(45) Date of Patent: Nov. 16, 2010

(54) PACKAGING MULTIPLE MEASURANDS INTO A COMBINATIONAL SENSOR SYSTEM USING ELASTOMERIC SEALS

(75) Inventors: Paul P. Bey, Jr., Hilliard, OH (US);
Craig S. Becke, London, OH (US);
Jamie W. Speldrich, Freeport, IL (US);
Christopher M. Blumhoff, Dixon, IL (US)

(73) Assignee: Honeywell International Inc., Morristown, NJ (US)

(*) Notice: Subject to any disclaimer, the term of this patent is extended or adjusted under 35 U.S.C. 154(b) by 614 days.

(21) Appl. No.: 11/821,421

(22) Filed: Jun. 22, 2007

(65) Prior Publication Data

US 2008/0314118 A1 Dec. 25, 2008

(51) Int. Cl.
*G01F 15/00* (2006.01)
*G01K 1/08* (2006.01)
*G01N 19/10* (2006.01)

(52) U.S. Cl. ........................ 73/431; 73/29.02; 73/29.05
(58) Field of Classification Search ................... 73/431, 73/29.02, 29.05
See application file for complete search history.

(56) References Cited

U.S. PATENT DOCUMENTS

| | | | |
|---|---|---|---|
| 3,410,287 A | 11/1968 | Van Der Heyden et al. | ... 137/36 |
| 4,341,107 A | 7/1982 | Blair et al. | ........................ 73/3 |
| 4,668,102 A | 5/1987 | Mott | |
| 5,000,478 A | 3/1991 | Kerastas | ..................... 280/707 |
| 5,050,429 A | 9/1991 | Nishimoto et al. | ....... 73/204.26 |
| 5,184,107 A | 2/1993 | Maurer | ........................ 338/42 |
| 5,410,916 A | 5/1995 | Cook | .......................... 73/706 |
| 5,631,417 A | 5/1997 | Harrington et al. | ........ 73/204.26 |
| 5,735,267 A | 4/1998 | Tobia | ..................... 128/204.21 |
| 5,827,960 A | 10/1998 | Sultan et al. | ............. 73/204.26 |
| 5,892,145 A | 4/1999 | Moon et al. | ................ 73/118.2 |
| 6,181,574 B1 | 1/2001 | Loibl | ......................... 361/816 |
| 6,543,449 B1 | 4/2003 | Woodring et al. | ........... 128/204 |
| 6,591,674 B2 | 7/2003 | Gehman et al. | .......... 73/204.22 |
| 6,595,049 B1 | 7/2003 | Maginnis, Jr. et al. | ...... 73/202.5 |
| 6,655,207 B1 | 12/2003 | Speldrich et al. | ........... 73/202.5 |

(Continued)

FOREIGN PATENT DOCUMENTS

EP 057288 1/1997

(Continued)

OTHER PUBLICATIONS

22/24/26PC Series, Interactive Catalog Replaces Catalog Pages, Micro Switch Sensing and Control, Honeywell.

(Continued)

*Primary Examiner*—Daniel S Larkin

(57) ABSTRACT

A combinational sensor system for measuring multiple measurands includes a flow transducer, a pressure transducer and a humidity transducer. The pressure and humidity transducers are provided with independent access to sensed media and are ratiometric to a supply voltage, whereas the flow sensor is sensitive to openings to the flow path. The combinational sensor system utilizes elastomeric seals that include patterned electrically conductive and non-conductive seals. An ASIC is generally associated with the combinational sensor, and is located on a patterned electrically conductive substrate lead frame or for signal conditioning in order to detect any of the sensed measurands. The transducers can be arranged in a manner that distributes the transducers to optimize the accuracy and response time of the combinational sensor system.

17 Claims, 4 Drawing Sheets

U.S. PATENT DOCUMENTS

| | | | |
|---|---|---|---|
| 6,681,623 B2 | 1/2004 | Bonne et al. | 73/202 |
| 6,681,625 B1 | 1/2004 | Berkcan et al. | 73/204.23 |
| 6,684,695 B1 | 2/2004 | Fralick et al. | 73/204.26 |
| 6,724,612 B2 | 4/2004 | Davis et al. | 361/328 |
| 6,725,731 B2 | 4/2004 | Wiklund et al. | 73/861.52 |
| 6,761,165 B2 | 7/2004 | Strickland, Jr. | |
| 6,769,285 B2 | 8/2004 | Schneider et al. | 73/1.06 |
| 6,805,003 B2 | 10/2004 | Ueki et al. | 73/204.26 |
| 6,820,481 B1 | 11/2004 | Weber et al. | 73/204.26 |
| 6,867,602 B2 | 3/2005 | Davis et al. | 324/664 |
| 6,871,537 B1 | 3/2005 | Gehman et al. | 73/204.26 |
| 6,904,799 B2 | 6/2005 | Cohen et al. | 73/204.11 |
| 6,904,907 B2 | 6/2005 | Speldrich et al. | 128/200.23 |
| 6,911,894 B2 | 6/2005 | Bonne et al. | 338/25 |
| 6,912,918 B1 | 7/2005 | Lynnworth et al. | 73/861.26 |
| 6,929,031 B2 | 8/2005 | Ford et al. | 137/887 |
| 6,945,118 B2 | 9/2005 | Maitland, Jr. et al. | 73/754 |
| 6,958,565 B1 | 10/2005 | Liu | 310/313 R |
| 7,073,392 B2 | 7/2006 | Lull et al. | 73/861 |
| 7,107,835 B2 | 9/2006 | Korniyenko et al. | 73/204.22 |
| 7,162,927 B1 | 1/2007 | Selvan et al. | |
| 7,243,541 B1 * | 7/2007 | Bey et al. | 73/431 |
| 7,430,918 B2 * | 10/2008 | Selvan et al. | 73/721 |
| 2003/0062045 A1 | 4/2003 | Woodring et al. | 128/204.18 |
| 2004/0026365 A1 | 2/2004 | Fuertsch et al. | 216/39 |
| 2004/0056765 A1 | 3/2004 | Anderson et al. | 340/522 |
| 2004/0250796 A1 | 12/2004 | Veinotte | 123/520 |
| 2005/0016534 A1 | 1/2005 | Ost | 128/204.18 |
| 2005/0022594 A1 | 2/2005 | Padmanabhan et al. | 73/204.26 |
| 2005/0087190 A1 | 4/2005 | Jafari et al. | 128/204.21 |
| 2005/0189343 A1 | 9/2005 | Griffin et al. | 219/494 |
| 2005/0204799 A1 | 9/2005 | Koch | 73/1.06 |
| 2006/0048568 A1 | 3/2006 | Korniyenko et al. | 73/204.22 |
| 2006/0059986 A1 | 3/2006 | Wildgen | 73/202.5 |
| 2006/0186529 A1 | 8/2006 | Shirasaka et al. | 257/690 |
| 2006/0208848 A1 | 9/2006 | Kawamoto et al. | 338/22 |

FOREIGN PATENT DOCUMENTS

KR    1020050075225    7/2005

OTHER PUBLICATIONS

40PC Series, Interactive Catalog Replaces Catalog Pages, Micro Switch Sensing and Control, Honeywell.
Design and Fabrication of Artificial Lateral Line Flow Sensors, Journal of Micromechanics and Microengineering, 12 (2002) 655-661.
U.S. Appl. No. 11/649,988, filed Jan. 4, 2007.
U.S. Appl. No. 11/356,814, filed Feb. 17, 2006.
U.S. Appl. No. 11/393,412, filed Mar. 30, 2006.
U.S. Appl. No. 11/366,653, filed Mar. 1, 2006.
U.S. Appl. No. 11/448,356, filed Jun. 6, 2006.
U.S. Appl. No. 11/436,807, filed May 18, 2006.
U.S. Appl. No. 11/729,130, filed Mar. 27, 2007.
US 7,021,135, 04/2006, Korniyenko et al. (withdrawn)

* cited by examiner

PACKAGING MULTIPLE MEASURANDS INTO A COMBINATIONAL SENSOR SYSTEM USING ELASTOMERIC SEALS

TECHNICAL FIELD

Embodiments are generally related to sensor methods and systems. Embodiments are additionally related to methods and systems for manufacturing and packaging multiple sensors in a single package. Embodiments are also related to combinational sensors.

BACKGROUND OF THE INVENTION

Many processes and devices have been implemented and used for measuring more than one measurand simultaneously. A miniature MEMS (Micro-Electro-Mechanical Systems) based flow or pressure transducer can be used to measure flow or pressure and with a reliable accuracy. Such MEMS based sensors have been implemented, for example, in various independent sensing devices, such as medical applications, some of which utilize silicon based thermal mass flow or piezoresistive sensing technology for measuring wide ranges of flow and pressure. Other multiple sensing implementations, for example, include instrumentation and environmental applications.

MEMS involve the integration of micro-mechanical elements, sensor actuators, and electronic components on a common silicon substrate through the use of micro fabrication technology. While the electronics can be fabricated using integrated circuit (IC) process sequences (e.g., CMOS, Bipolar, or BICMOS processes), the micromechanical components can be fabricated utilizing compatible "micromachining" processes that selectively etch away parts of the silicon wafer or add new structural layers to form the mechanical and electromechanical devices.

The majority of prior art transducers are either sold with calibrated or un-calibrated analog outputs or as transducers with small-signal outputs, either of which may need to be conditioned and calibrated by the end user within their system. Further, the analog signals conditioned by the user must pass through an analog-to-digital converter so that the output signals can be processed by the system, which may be microcontroller-based. The most common measurands are flow, pressure, temperature and humidity and the output signals from the raw transducers are typically not linear and vary as a function of temperature.

In some sensing applications, it is preferred that signal conditioning/signal amplification capability be incorporated into the sensor. It is believed that there are currently no sensors available for efficiently and accurately measuring multiple measurands. Therefore, to overcome the foregoing shortcomings, it is desirable to provide a suitable packaging method and/or system for measuring multiple measurands. It is further believed that if such a sensor is implemented, the resultant sensor design can assist in lowering installation and development costs, while eliminating secondary operations and shortening the design cycle time.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for improved sensor methods and systems.

It is another aspect of the present invention to provide packaging for a combinational sensor for measuring multiple measurands.

It is another aspect of the present invention to provide for a method of designing a combinational pressure sensor system for measuring multiple measurands.

The aforementioned aspects and other objectives and advantages can now be achieved as described herein. A combinational sensor system for measuring multiple measurands includes a flow sensor, a pressure sensor and a humidity sensor. The pressure sensor and humidity sensor can have independent access to the media and are ratiometric to the supply voltage, whereas the flow sensor is sensitive to openings to the flow path. The combinational sensor utilizes elastomeric seals in which at least one seal is electrically conductive. An Application Specific Integrated Circuit (ASIC) is generally associated with the combinational sensor, wherein the ASIC can be placed on a patterned electrically conductive substrate, e.g. printed circuit board or thick film based ceramic, or lead frame for signal conditioning in order to detect flow, pressure, humidity or temperature. The transducers can be arranged in order to optimize accuracy and/or response time of the combinational sensor system for optimal access to the media.

The geometry of the combinational sensor system for measuring multiple measurands includes a pressure transducing silicon die which includes piezoresistive material. A MEMS (Microelectromechanical System) sensing diaphragm is generally associated with the piezoresistive material, wherein the sensing diaphragm deflects when a pressure is applied thereto. An impedance circuit is generally embedded with one or more piezoresistive elements on the sensing diaphragm to which the pressure to be detected is applied. Electrical connections to the piezoresistive elements are made to electrical contacts placed on either the front or back-side of the silicon die. The silicon die is located between a patterned sandwich combination of a conductive elastomeric seal and a non-conductive elastomeric pressure seal making electrical connections to respective electrical contacts on the surface of a silicon die. A non-conductive elastomeric pressure seal makes a mechanical seal on the opposite face on the silicon die.

The combinational sensor system can also include other silicon-based transducers which can include a humidity sensor. This embodiment of a transducer can be mounted in a similar manner to the pressure transducing silicon die in the above.

The patterned sandwich combination of conductive elastomeric seal and non-conductive elastomeric pressure seal can be used for providing an electrical contact from the impedance circuit associated with the silicon piezoresistive material to the patterned electrically conductive substrate or lead frame connected to the ASIC. This generally includes an un-amplified Wheatstone bridge output or an amplified output of the bridge response of a pressure transducer. The non-conductive elastomeric pressure seal can be placed on the non-conductive regions of a silicon die. The non-conductive pressure seal on each elastomeric seal will also provide a liquid seal allowing for very high humidity or liquid media.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
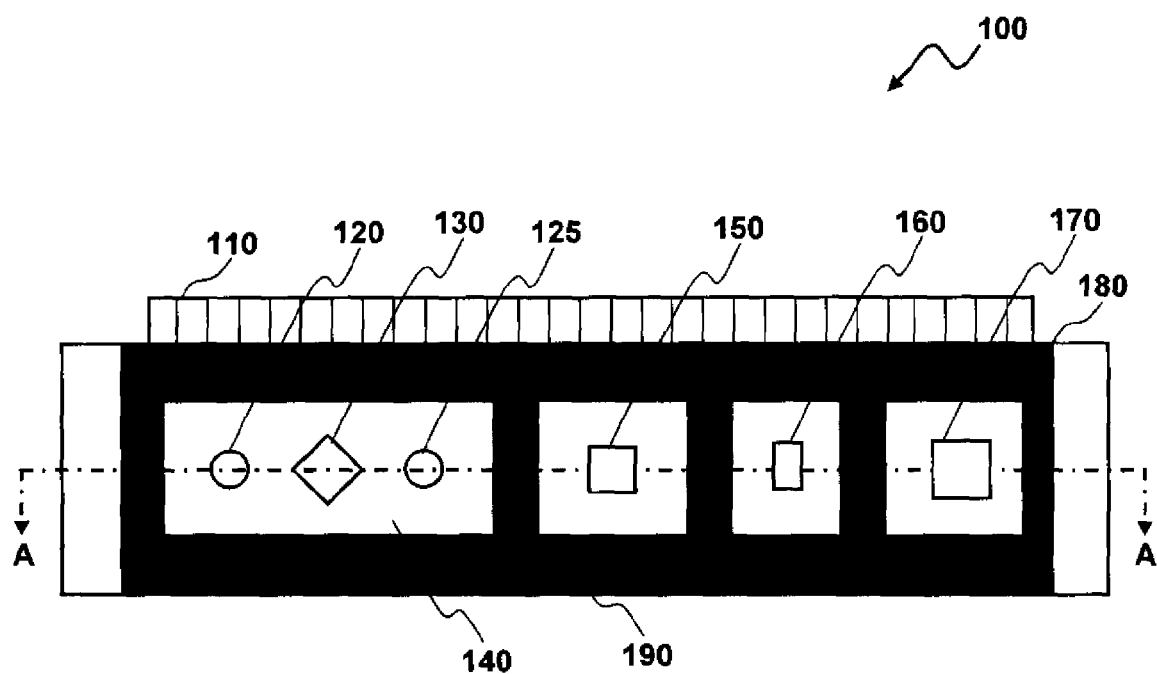
FIG. 1 illustrates a perspective view of a combinational sensor system, which can be implemented in accordance with a preferred embodiment.

FIG. 1 illustrates a perspective view of a combinational sensor system 100, which can be implemented in accordance with a preferred embodiment. The combinational sensor 100 can measure multiple measurands and includes a flow tube 180 in association with a mass flow die 130, a pressure sensor 150 and a humidity sensor 160. A pair of sampling ports 120 and 125 can be provided. The pressure sensor 150 and the humidity sensor 160 can each possess independent access to the media and are ratiometric to the supply voltage (not shown), whereas the air flow die 130 is sensitive to openings to the flow path of the flow tube 180.

An ASIC 170 is generally associated with the combinational sensor system 100. The ASIC 170 can be placed on a patterned electrically conductive substrate or lead frame 190 for signal conditioning in order to detect flow, pressure, humidity and/or temperature. An electrical interconnect 110 can be utilized for the electrical connection of the combinational sensor system 100 to the supporting application. The pressure sensor 150, humidity sensor 160, and air flow die 130 can be arranged in a manner that distributes the transducers 130, 150, or 160 in order to optimize the accuracy and/or response time of the combinational sensor system 100.

Figure 2:
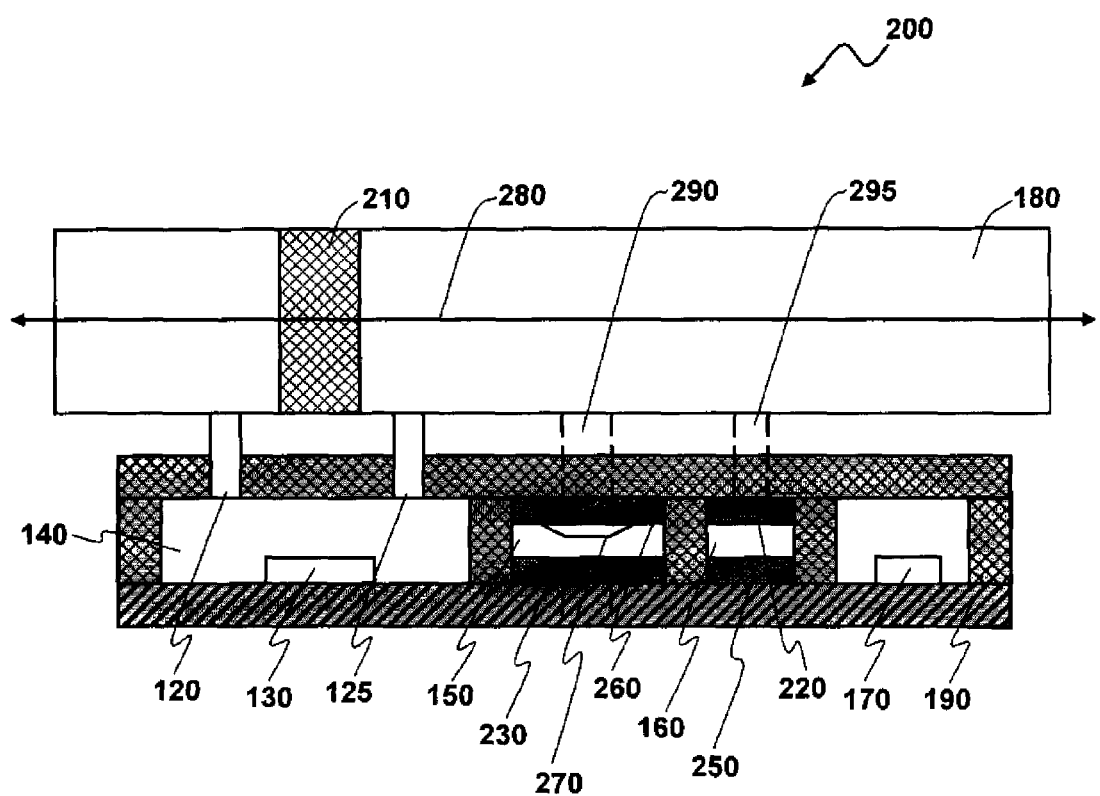
FIG. 2 illustrates a sectional view A-A of a combinational sensor system, which can be implemented in accordance with an alternative embodiment.

FIG. 2 illustrates a sectional view A-A of a combinational sensor system 200 with a flow restrictor or pitot tube flow-sampling element 210, which can be implemented in accordance with an alternative embodiment. Note that in FIGS. 1-3, identical or similar parts or elements are generally indicated by identical reference numerals. For example, the flow tube 180, the air flow transducer 130, the pressure transducer 150 and the humidity transducer 160 depicted in FIG. 1 also appears in the configuration of sensor 200 depicted in FIG. 2. Arrow 280 indicates the bi-directional flow of air through the flow tube 180, which passes through the flow restrictor or over a flow-sampling element such as a pitot tube 210. In the case of a flow restrictor 210 disposed in the flow tube 180, a pressure drop is created in the air flow bypass chamber 140. A pair of sampling ports 120 and 125 are generally arranged in adjacent locations of flow tube 180. For the pitot tube, ports 120 and 125 will reside on opposite sides of pitot tube 210. Another pair of sampling ports 290 and 295 can be arranged in any position of flow tube 180. The media flows into the sampling ports 290 and 295 arranged in the flow tube 180 and which is exposed to the pressure sensor 150 and humidity sensor 160 for measurement.

The geometry of the transducers 150 and 160 for measuring multiple measurands includes a piezoresistive material or humidity sensitive dielectric material (not shown) located between a patterned sandwich combination of conductive elastomeric and non-conductive elastomeric pressure seals 230 and 250 and non-conductive elastomeric pressure seals 220 and 260. The patterned sandwich combination of conductive elastomeric and non-conductive elastomeric pressure seals 230 and 250 can be used for the electrical connection of the sensors 160 and 150 to the substrate 190 that connects to the ASIC 170 and for mechanical "sealing" around the conductive connections to prevent shorting and leaking. The non-conductive elastomeric seals 220 and 260 can be utilized for mechanical "sealing" of the sensors 160 and 150 within the combinational sensor 100. The pressure sensor 150 includes a sensing diaphragm 270 that is generally associated with the piezoresistive material, wherein the sensing diaphragm 270 deflects when a pressure is applied thereto. The ASIC 170 is generally placed on a patterned electrically conductive substrate or lead frame 190 so that either a temperature sensor in the ASIC 170 or other temperature sensing mechanism local to the other measurands can be used for temperature compensation. The pressure sensor 150 and humidity sensor 160 are ratiometric to the supply voltage (not shown).

Figure 3:
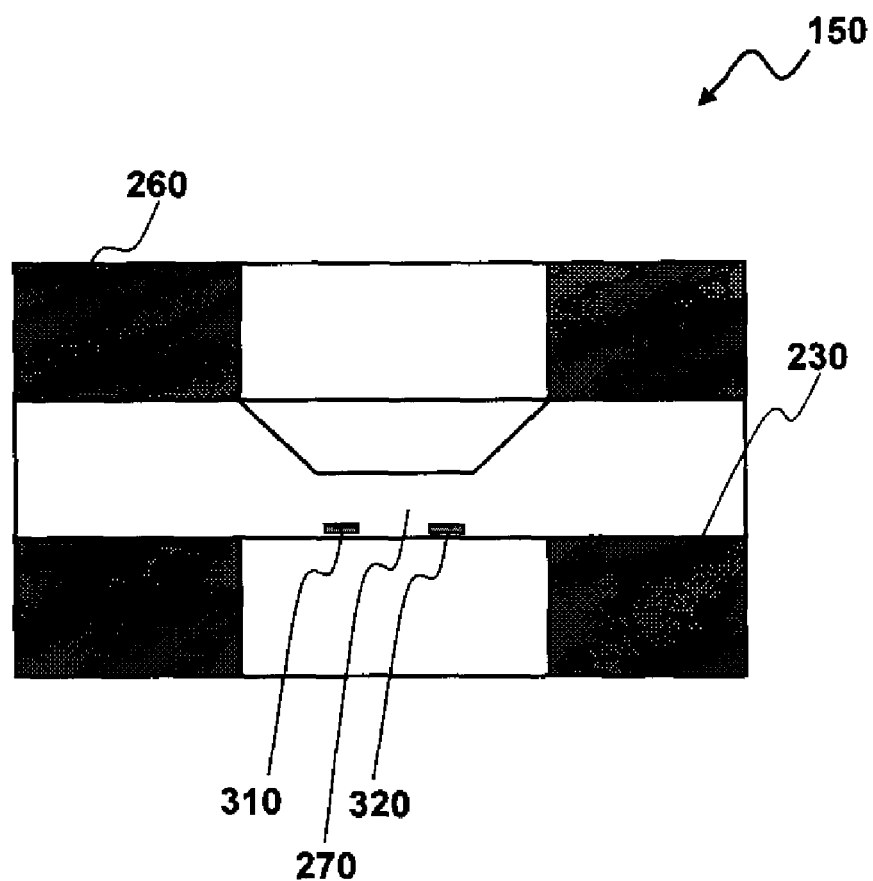
FIG. 3 illustrates a detailed view of the pressure sensor shown in FIGS. 1-2, in accordance with a preferred embodiment.

FIG. 3 illustrates a detailed view of the pressure sensor 150 depicted in FIG. 1, which can be implemented in accordance with a preferred embodiment. The pressure sensor 150 contains a diaphragm 270 that includes two sets of piezoresistors 310 and 320 buried in the face of a thin, chemically-etched silicon diaphragm 270. The pressure causes the diaphragm 270 to flex, inducing a stress or strain in the diaphragm 270 and the buried resistors 310 and 320. The resistors 310 and 320 values change in proportion to the stress applied and thereafter produces an electrical signal. The patterned sandwich combination of conductive elastomeric seal and non-conductive elastomeric pressure seal 230 can be utilized for providing an electrical contact from the impedance circuit associated with the silicon piezoresistors 310 and 320 to a patterned electrically conductive substrate or lead frame 190 connected to the ASIC 170.

Such a configuration generally includes the use of an un-amplified Wheatstone bridge output or an amplified output of the bridge response of the pressure sensor 150. The silicon piezoresistors 310 and 320 can be configured as a four-resistor Wheatstone bridge fabricated on a single monolithic die utilizing micromachining technology. The non-conductive elastomeric pressure seal 260 can be placed on the backside. The patterned sandwich combination of conductive elastomeric seal and non-conductive elastomeric pressure seal 230 and the non-conductive elastomeric pressure seal 260 also provide a liquid seal allowing for very high humidity or liquid media.

Figure 4:
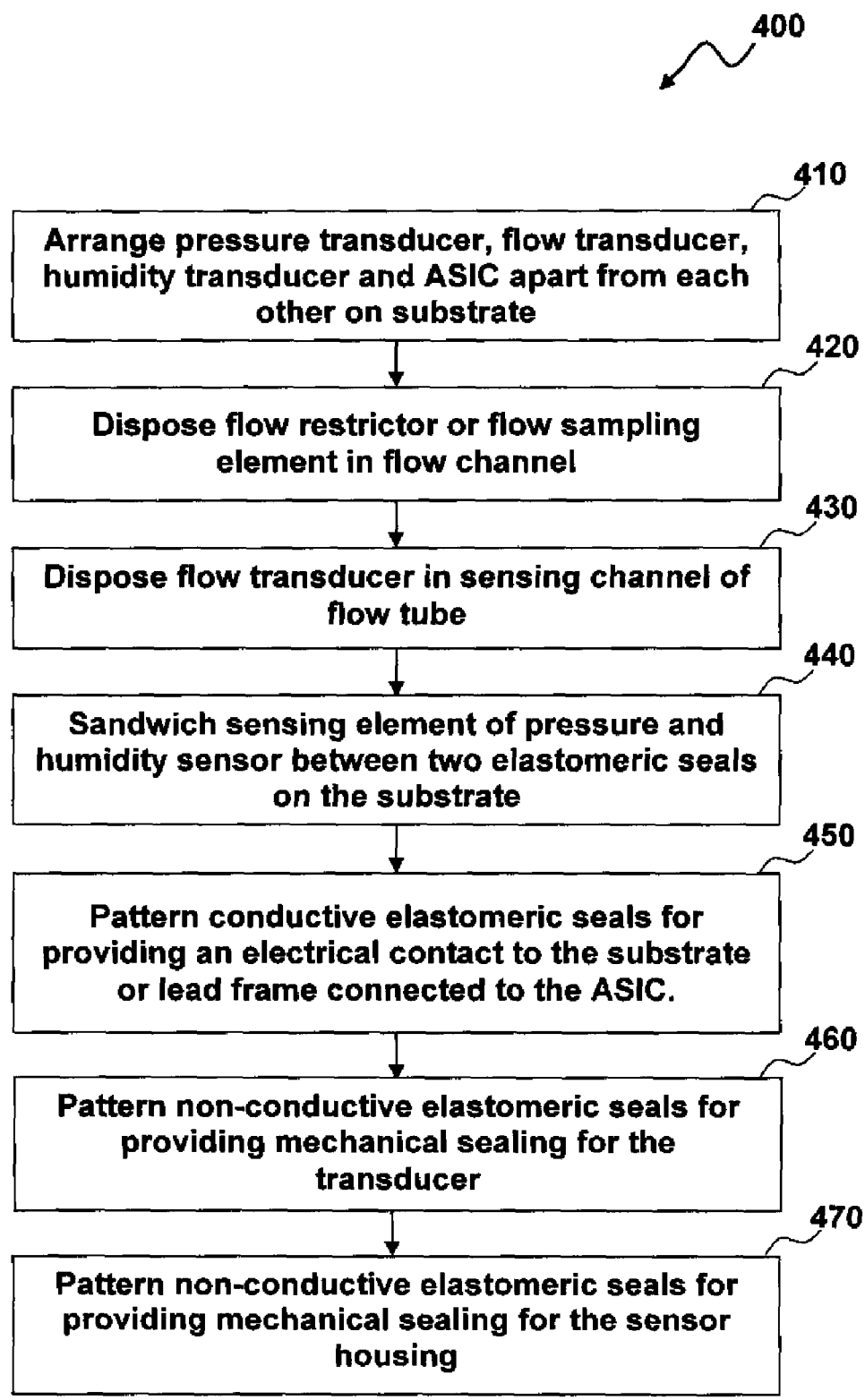
FIG. 4 illustrates a high level flow diagram of operations depicting logical operational steps of a method for designing a combinational sensor system, in accordance with a preferred embodiment.

FIG. 4 illustrates a high level flow diagram of operations depicting a method 400 for designing a combinational sensor system, in accordance with a preferred embodiment. The pressure sensor 150, flow transducer 130, humidity transducer 160 and ASIC 170 can be arranged apart from each other on substrate 190, as depicted at block 410. Thereafter, as indicated at block 420, a flow restrictor or a flow-sampling element such as a pitot tube 210 can be disposed in flow tube 180. Flow sensor die 130 can be disposed in sensing channel of flow tube 180, as shown at block 430. Next, as described at block 440, a sensing element of pressure transducer 150 and humidity transducer 160 can be sandwiched between two elastomeric seals 230, 260 and 220, 250 on the substrate 190.

The conductive elastomeric seals 230 and 250 can be patterned for providing an electrical contact to a patterned electrically conductive substrate or lead frame 190 connected to the ASIC 170, as depicted at block 450. The non-conductive elastomeric seals 220 and 260 can be patterned for providing mechanical sealing for the transducers 160 and 150, as illustrated at block 460. Non-conductive elastomeric seals can also be patterned for providing mechanical sealing for the sensor housing, as illustrated at block 470.

The combinational sensor system described herein can be inexpensively manufactured and marketed and can include temperature compensation and calibration capabilities, along with media flow-through ports and true "wet" differential sensing. Such a sensor system is also operable after exposure to frozen conditions with a choice of termination for gage sensors. The disclosed combinational sensor system can also provide interchangeability, proven elastomeric construction, ASIC-based signal conditioning and digital output and can be used to measure vacuum or positive pressure.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A combinational sensor system for measuring multiple measurands, comprising:
   a flow conduit configured to receive a media flow therethrough;
   a substrate provided adjacent to the flow conduit;
   a plurality of transducer elements positioned adjacent the substrate and arranged apart from one another;
   a plurality of sampling ports formed in the flow conduit and configured to expose the plurality of transducer elements to the media so that the plurality of transducers may measure a plurality of measurands; and
   signal conditioning circuitry positioned on the substrate in communication with the plurality of transducer elements and configured to condition one or more signal received from the plurality of transducer elements.

2. The system of claim 1 wherein the signal conditioning circuitry includes an integrated circuit.

3. The system of claim 1 further comprising:
   a conductive elastomeric seal and a non-conductive elastomeric seal positioned adjacent at least one of said plurality of transducer elements; and
   a plurality of electrical connectors electrically connected to the signal conditioning circuitry via one or more electrically conductive patterns formed on said substrate.

4. The system of claim 3 wherein said conductive elastomeric seal is configured to electrically connect at least one of said plurality of transducer elements to a patterned electrically conductive element on said substrate.

5. The system of claim 3 wherein said non-conductive elastomeric seal is configured to provide a mechanical seal between one or more of said plurality of transducer elements and said flow conduit.

6. The system of claim 1 wherein said plurality of transducer elements include a piezoresistive pressure transducer.

7. The system of claim 6 wherein said piezoresistive pressure transducer includes an impedance circuit having two or more resistors arranged to form a Wheatstone bridge.

8. The system of claim 1 wherein said plurality of transducer elements include a humidity sensor.

9. The system of claim 1 wherein said signal conditioning circuitry is configured to include temperature compensation.

10. The system of claim 1 wherein said plurality of transducer elements include an air flow transducer.

11. A combinational sensor system for measuring multiple measurands, comprising:
    a flow tube configured to receive a media flow therethrough;
    a substrate provided adjacent to the flow tube;
    a plurality of transducer elements positioned on the substrate in a spaced apart arrangement;
    a plurality of sampling ports formed by the flow tube adjacent to the said substrate in order to expose said plurality of transducer elements to said media; and
    an integrated circuit positioned adjacent said substrate in electrical connection with said plurality of transducer elements.

12. The system of claim 11 further comprising:
    a conductive elastomeric seal and a non-conductive elastomeric seal positioned adjacent said plurality of transducer elements; and
    a plurality of electrical connectors electrically connected to said integrated circuit via one or more electrically conductive patterns formed on said substrate.

13. The system of claim 12 wherein said conductive elastomeric seal is configured to in electrically connect at least one of said plurality of transducer elements to one or more of the electrically conductive patterns formed on said substrate.

14. The system of claim 12 wherein said non-conductive elastomeric seal is configured to provide a mechanical seal between one or more of said plurality of transducer elements and said flow tube.

15. A combinational sensor system for measuring multiple measurands, comprising:
    a flow tube;
    a patterned electrically conductive substrate provided adjacent to the flow tube;
    a plurality of transducer elements positioned on the patterned electrically conductive substrate;
    a plurality of sampling ports formed in the flow tube in registration with said plurality of transducer elements;
    a conductive elastomeric seal and a non-conductive elastomeric seal positioned adjacent at least one of said plurality of transducer elements, wherein said conductive elastomeric seal electrically connects at least one of said plurality of transducer elements to a patterned electrically conductive substrate; and
    a signal conditioner positioned on said patterned electrically conductive substrate, wherein said signal conditioner is electrically connected to at least one of the plurality of transducer elements via the conductive elastomeric seal, and is configured to condition one or more signals received from said at least one of said plurality of transducer elements.

16. The system of claim 15 wherein said plurality of transducer elements include a pressure transducer.

17. The system of claim 16 wherein said pressure transducer includes an impedance circuit that includes two or more resistors arranged in a Wheatstone bridge configuration.

* * * * *